United States Patent [19]

Scheller et al.

[11] 3,910,881

[45] Oct. 7, 1975

[54] METHOD FOR THE PRODUCTION OF NITRIC ESTERS OF HYDROXYSTEROID LACTONES OR THEIR GLYCOSIDES

[75] Inventors: Frieder Scheller, Berlin; Rudolf Megges, Berlin-Buch; Frank Dittrich, Dresden; Kurt Repke; Hans Joachim Portius, both of Berlin-Buch; Gunter Kammann, Radebeul; Hans-Jorg Schmidt, Dresden; Knut-Olaf Haustein, Erfurt, all of Germany

[73] Assignee: Veb Arzneimittelwerk Dresden, Radebeul, Germany

[22] Filed: June 11, 1973

[21] Appl. No.: 369,025

[30] Foreign Application Priority Data

June 15, 1972 Germany.............................. 165405

[52] U.S. Cl................................ 260/210.5; 424/182
[51] Int. Cl.².......................................... C07J 41/00
[58] Field of Search............. 260/210.5, 235, 209 D

[56] References Cited
OTHER PUBLICATIONS

Pigman, Ward, The "Carbohydrates," Academic Press Inc., Publishers, New York, 1957, p. 169.
Smith, p.a.s., "Open Chain Nitrogen Compounds" Vol. II, Benjamin, Inc., New York, 1966, p. 489.
Kaufman et al. J.A.C.S., Vol. 74, pp. 4997–5001 (1952).
Merrow et al. J.A.C.S. Vol. 75, pp. 4259–4265 (1953).
Pigman, Ward, "The Carbohydrates," Acad. Press Inc., Publishers, New York, 1957, p. 170.

*Primary Examiner*—Johnnie R. Brown
*Assistant Examiner*—Cary B. Owens
*Attorney, Agent, or Firm*—Nolte and Nolte

[57] ABSTRACT

Method for the production of a nitric ester of a hydroxysteroid lactone or a nitric ester of a glycoside of a hydroxysteroid lactone, the nitric ester containing at least one of free primary and/or secondary hydroxy groups, comprising subjecting a nitric ester of a hydroxysteroid lactone or a nitric ester of a glycoside of a hydroxysteroid lactone, the nitric ester containing more than one of primary and/or secondary nitrate groups and being free of primary and secondary hydroxy groups, to reduction reaction conditions for said more than one of primary and/or secondary nitrate groups thereby to partially convert the nitrate groups to free hydroxy groups. Novel nitric esters thereby produced include cymarol-19-nitrate, 16epi-gitoxin-16-nitrate, gitoxin-16-nitrate, digoxin-12-nitrate and helveticosol-19-nitrate. The nitric esters are useful as drugs having an inotropic or involuntary muscle-relaxing effect.

1 Claim, No Drawings

METHOD FOR THE PRODUCTION OF NITRIC ESTERS OF HYDROXYSTEROID LACTONES OR THEIR GLYCOSIDES

This invention relates to a method for the production of nitric esters of hydroxysteroid lactones or their glycosides which contain free primary and/or secondary OH-groups and to novel nitric esters thereby produced.

The presently known compounds of this type are produced by partial esterification of hydroxysteroid lactones or their glycosides with nitric acid according to German Democratic Republic (East German) Pat. No. 81,106. But a great number of the many possible position-isomers cannot be produced according to this method, because the esterification with nitric acid occurs at the OH-groups successively depending on their reactivity.

The invention provides a method for the production of hitherto unobtainable or difficulty obtainable nitric esters of hydroxysteroid lactones or their glycosides which contain primary and/or secondary OH-groups.

According to the invention, primary and/or secondary nitrate groups of nitric esters of hydroxy lactones or their glycosides which contain no primary and/or secondary OH-groups, are partially converted into OH-groups by reduction. The reduction is effected electrochemically or by means of reducing substances, for example, sulfides, such as ammonium sulfide, thiols or sodium borohydride. The reduction is carried out according to the invention in a pH range between 3 and 10 and at temperatures between 0° and 50°C, preferably at room temperature.

Suitable are all solvents and solvent mixtures which dissolve the starting materials, do not react with them, and are not changed under the reaction conditions. Examples are lower alcohols, aliphatic acid amides, ethers, carboxylic acids, nitriles, amines, ketones, esters, if necessary in mixture with water.

Suitable as a conducting salt and buffer for the electrochemical reduction is, for example, tetra-N-butylammonium acetate ($B_4Nac$) or tris-(hydroxymethyl)-amino-methane —HCL buffer.

As starting materials of the method according to the invention are used the nitric esters which are easily obtainable according to German Democratic Republic Pat. No. 81,106 and which contains no primary and/or secondary OH-groups, for example, of gitoxigenin, 16epi-gitoxigenin, digoxigenin, strophanthidol, ouabagenin, digitoxin, gitoxin, digoxin, 17 α-hydroxydigitoxin, lanatoside A,B,C, desacetyllanatoside A,B,C, cymarol, helveticoside, helveticosol, convallatoxin, convallatoxol, ouabain, proscillaridin A, scillaren A, neriifolin, cerberoside, k-strophanthin-β, k-strophanthol β, k-strophanthinγ, k-strophantholγ, or the corresponding 14-anhydro- or 14,16-dianhydro- or perhydro- or 14,21-epoxydihydro- (of Cardenolides) or 19-carboxylic acid derivatives.

The reductive conversion of nitric ester groups into OH-groups is known in itself. New, however, is the partial conversion of nitric esters with more than one nitric ester group. That defined mononitric esters, for example, are obtained in good yields is highly surprising in view of the fact that the polyarograms of the nitric esters having more than one nitric ester group mostly show only a single nitric ester step so that a distinction between nitric ester groups on the sugar radical and on the steroid radical, for example, is not possible.

The nitric esters produced according to the invention are biologically active and can be used as drugs with an inotropic or involuntary muscle-relaxing effect, also as valuable intermediate products for other syntheses.

The invention will be described below more fully on the basis of examples without being limited by them in any way.

EXAMPLE 1

300 mg. cymarol dinitrate are dissolved in 150 ml. isopropanol and 50 ml. 2N $B_4Nac$ aqueous solution having a pH of 7 are added. The electrolysis is carried out at room temperature and a constant cathode potential of 650 mV between a mercury cathode and a platinum anode until 113 Faraday have flowed. The anode is separated from the cathode space by a glass diaphragm. As a reference electrode is used as a saturated calomel electrode. The electrolyte is stirred and the oxygen is expelled with purified nitrogen. After dilution with water, the solution is extracted with chloroform. The extracted crude product contains approximately 90% cymarol-19-nitrate which is obtained pure by chromatography (silica gel as adsorbent; ethyl acetate -ethanol-chloroform solvent mixture in the volume proportions 67.5 : 7.5 : 25) (184 mg. yield).

$R_{cymarol-4,19-dinitrate} \cdot 100 = 63$ (cymarol: $R_{cymarol-4,19-dinitrate} \cdot 100 = 30$)

Thin-layer chromatography: silica gel G, 0.3 mm. coat thickness, solvent see above, two stage development.

Fluorescence color: orange ($SbCl_3$, UV). m-dinitrobenzene reaction: positive (butenolide ring).

Reduction (zinc, acetic acid, dioxane) yields cymarol.

UV (ethanol): max. 214 nm. IR: $—ONO_2$, 1275, 1625 $cm^{-1}$, lactone-CO, 1730 $cm^{-1}$. Acid hydrolysis yields strophanthidol -19-nitrate; $R_{strophanthidol} \cdot 100 = 245$ (chloroform + 5% ethanol, two-stage development).

EXAMPLE 2

200 mg. cymarol dinitrate are dissolved in 200 ml. dioxane and 35 ml. 1N aqueous tris-(hydroxymethyl)-aminomethane-HC1 buffer solution having a pH of 9 are added. With cooling to 0°C, the procedure of Example 1 is followed. 153 mg. cymarol-19-nitrate are obtained.

EXAMPLE 3

75 mg. cymarol dinitrate are dissolved in 40 ml. dimethyl formamide, 10 ml. aqueous 2N $B_4Nac$ solution having a pH of 5 are added and the solution is reduced at 40°C electrolytically as in Example 1. 59 mg. cymarol-19-nitrate are obtained.

EXAMPLE 4

250 mg. 16 epi-gitoxin pentanitrate are dissolved in 450 ml. isopropanol and 50 ml. of an aqueous solution of 2N $B_4Nac$ having a pH of 7 are added. The electrolysis is carried out with the same apparatus as in Example 1 at a potential of 800 mV. until 240 Faraday have flowed. The extracted steroid mixture contains about 80% 16epigitoxin -16-nitrate which is obtained pure by chromatography on silica gel (yield, 142 mg.).

$R_{16epi-gitoxin} \cdot 100 = 220$

Thin layer chromatography: chloroform + 10% by volume ethanol, two-stage development.

Fluorescence color: blue. m-dinitrobenzene reaction: positive (butenolide ring).

Diphenylamine-UV-reaction: positive (nitrate). Xanthydrol reaction: positive (digitoxose). Acid hydrolysis yields 16epi-gitoxigenin-16-nitrate.

$R_{16epi-gitoxigenin = 100} = 250$. Thin layer chromotography: as above.

Fluorescence color: blue. m-dinitrobenzene-, diphenylamine -UV-reaction: positive. Xanthydrol reaction: negative.

EXAMPLE 5

30 mg. gitoxin pentanitrate are dissolved in 500 ml. isopropanol and 80 ml. aqueous 2N B₄Nac solution are added. The electrolysis is effected according to Example 4. The extracted steroid mixture contains gitoxin-16-nitrate, which is obtained pure by chromatography (yield, 8 mg.).

$R_{gitoxin = 100} = 160^-$

Thin layer chromatography: as in Example 4, but one-stage development.

Fluorescence color: blue m-dinitrobenzene reaction, diphenylamine-UV-reaction, xanthydrol reaction: positive.

EXAMPLE 6

100 mg. digoxin pentanitrate are dissolved in 300 ml. ethanol and 50 ml. aqueous 2N B₄Nac solution are added. The electrolysis is effected as in Example 4. The extracted steroid mixture contains digoxin-12-nitrate which is obtained pure by chromatography on silica gel (59 mg.).

$R_{digoxin = 100} = 122$

Thin layer chromatography: as in Example 4
Fluorescence color: blue m-dinitrobenzene reaction, diphenylamine-UV-reaction, xanthydrol reaction: positive.

EXAMPLE 7

500 mg. helveticosol trinitrate are dissolved in 300 ml. isopropanol, 50 ml. aqueous 2N B₄Nac solution are added, and the electrolysis is effected as in Example 1. Helveticosol-19-nitrate (289 mg.) is obtained pure from the extracted steroid mixture by chromatography on silica gel.

$R_{helveticosol = 100} = 182$

Thin layer chromatography: ethyl acetate-ethanol-chloroform 67.5 : 7.5 : 25 parts by volume, three-stage development.

Fluorescence color: orange.

m-dinitrobenzene reaction, diphenylamine-UV-reaction, xanthydrol reaction: positive.

EXAMPLE 8

133 mg. proscillaridin trinitrate in 50 ml. ethanol is mixed with 1.89 g. cysteine hydrochloride in 30 ml. water and 40 ml. tris-(hydroxymethyl)-aminomethane-HCl buffer (pH 9) and the resultant solution is left standing under nitrogen for 8 days at room temperature. After dilution with water, the solution is extracted with chloroform. The chromatographic separation of the extracted steroid mixture yields the following nitrates:

| $R_{proscillaridin\ trinitrate = 100}$ | fluorescent color | yield, % |
| --- | --- | --- |
| I | 72 | brown-red | 6 |
| II | 58 | " | 39 |
| III | 25 | " | 7 |

Thin layer chromatography: chloroform-ethyl acetate-butanol-80:19:1 parts by volume; developing time: 1 hour.

I–III yield proscillaridin on reduction.

EXAMPLE 9

124 mg. ouabagenin tetranitrate are treated for 6 days as in Example 8. The following nitrates are obtained:

| $R_{ouabagenin\ tetranitrate = 100}$ | yield, % |
| --- | --- |
| I | 80 | 27 |
| II | 62 | 23 |

Thin layer chromatography: ethyl acetate-ethanol - chloroform 67.5 : 7.5 : 25, two-stage development.

m-dinitrobenzene reaction: I, II: positive.

EXAMPLE 10

96 mg. 16epi-gitoxigen dinitrate are treated as in Example 8. After 7 days 16epi-gitoxigenin nitrate is obtained.

$R_{16epi-gitoxigenin\ dinitrate = 100} = 60$

Fluorescence color: blue

Yield: 31%

Thin layer chromatography: as in Example 9, one-stage development.

EXAMPLE 11

To the solution of 100 mg. digoxin pentanitrate in 50 ml. alcohol, 370 mg. thioacetamide are added in 10 ml. concentrated ammonia and the mixture is left standing for 24 hours. Preparation according to Example 8 yields 3 nitrates:

| $R_{digoxin\ pentanitrate = 100}$ | fluorescence color | yield, % |
| --- | --- | --- |
| I | 92 | blue-grey | 31 |
| II | 87 | " | 33 |
| III | 41 | " | 9 |

Thin layer chromatography: CHCl₃ + 5% ethyl alcohol by volume, two-stage development.

EXAMPLE 12

300 mg. digoxin pentanitrate is dissolved in 90 ml. alcohol, to which 940 mg. sodium borohydride in 10 ml. water as well as 36 mg. nickel nitrate in 1 ml. water are added, and is left standing for 30 minutes. Preparation as in Example 8 yields 2 digoxin nitrates:

| $R_{digoxin\ pentanitrate = 100}$ | fluorescence color | yield, % |
| --- | --- | --- |
| I | 89 | blue-grey | 35 |
| II | 82 | " | 49 |

Thin layer chromatography: $CHCl_3$ + 15% ethyl alcohol by volume.

What is claimed is:
1. A compound selected from the group consisting of cymarol-19-nitrate, 16epi-gitoxin-16-nitrate, gitoxin-16-nitrate, digoxin-12-nitrate and helveticosol-19-nitrate.

* * * * *